Figure 1:
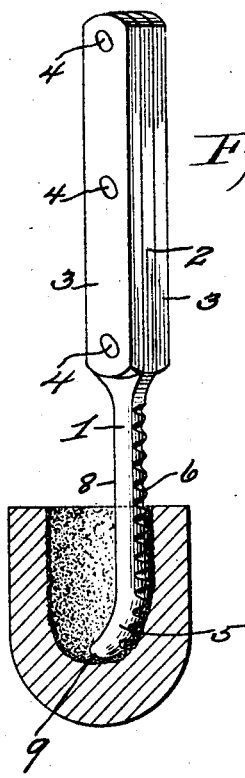

Dec. 11, 1928.  1,695,145

F. L. FRASER

PIPE BOWL KNIFE

Filed July 20, 1927

Fred L. Fraser, INVENTOR

BY Victor J. Evans

ATTORNEY

WITNESS:

Patented Dec. 11, 1928.

1,695,145

UNITED STATES PATENT OFFICE.

FRED L. FRASER, OF PHILADELPHIA, PENNSYLVANIA.

PIPE-BOWL KNIFE.

Application filed July 20, 1927. Serial No. 207,238.

The present invention relates to an improved pipe bowl knife especially constructed, whereby it may serve to positively and thoroughly cut or loosen any accumulation of carbon material from the inner surface of the bowl of the pipe, and after cutting or loosening or fractioning the material a reverse movement of the knife may be employed to smooth the inner surface of the bowl.

Tobacco pipe cleaners have been prepared, some having teeth and other having sharpened edges and some having two jaws yieldably mounted, others are in the form of pointed implements or spoon shaped implements or in the form of a widened blade, and the best of these have been found unsatisfactory. As an example those which consist of two jaws mounted upon a spring with one of the jaws toothed, it is more or less difficult to insert the two jaws into the pipe bowl, especially after the bowl is considerably caked with carbon material, and furthermore such teeth are not formed, such as will properly rupture, cut or loosen the carbon material. Those which have implements of spoon formation the same difficulty arises. Furthermore a sharpened implement will tend to grind out the surface of the bowl and produce an undesirable uneven surface, and this is especially true regarding the bottom of the bowl.

It is, therefore, the purpose of the present invention to provide an improved pipe bowl cleaning knife, which consists of a blade of the general formation as shown in the drawings, constructed of any suitable material, preferably steel, properly tempered for this purpose, and which is arcuate in cross section with its extremity terminating in a curved portion which conforms to the bottom of the pipe bowl, said blade having a handle portion which is faced on opposite sides by aluminum pieces.

Another purpose is to provide a blade of this kind wherein one edge of the blade is provided with a series of teeth, and due to the blade being of arcuate formation in cross section and the manner in which the blade is held when in action, the teeth are directed toward the surface of the bowl so as to readily rupture, cut or loosen the carbon material, when the blade is moved in one direction.

A further purpose is to provide a blade with a smoothing edge, which is caused to be formed due to the transverse curvature of the blade, the knife relying on a reverse movement of the knife so that the smoothing edge may smooth the inner surface of the pipe bowl. Also due to the curvature of the blade, such smoothing edge is directed toward the surface of the pipe bowl.

A still further purpose is to provide a pipe bowl cleaning knife with means to even up the bottom of the pipe bowl as well as rupturing, loosening or cutting the carbon at the bottom, the opposite edges of the said curved portion to conform to the smoothness of the vertical surface of said inner wall of the bowl.

A still further purpose is to provide the curved extremity with a rounded smoothing edge, which is a continuation of the previous smoothing edge.

It is to be understood that the particulars herein given are in no way limitive, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:

Figure 1—is a view in perspective of the improved pipe bowl cleaning knife constructed in accordance with the invention, and showing the blade in position in the act of cutting carbon material from the bowl of the pipe.

Figure 2:
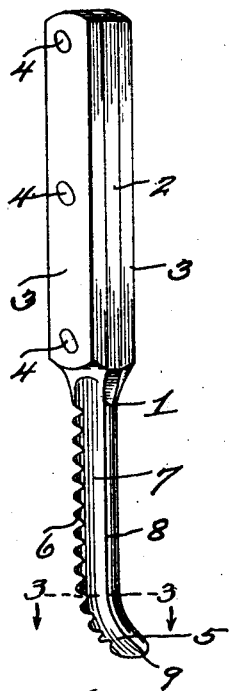

Figure 2—is a perspective view, more clearly showing the opposite part of the blade.

Figure 3:
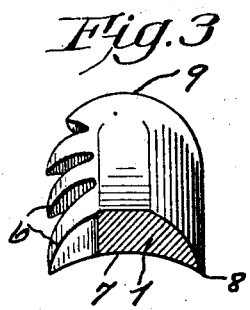

Fig. 3—is a cross section view on line 3—3 of Figure 2, to more clearly show the curvature of the blade in cross section.

Referring to the drawings, 1 identifies the blade of the pipe bowl cleaning knife which is constructed of any suitable metal preferably steel and is provided with a shank 2, which is faced by aluminum pieces 3 riveted or otherwise fastened to the shank as at 4, thereby providing a suitable handle for the blade. It is obvious that this blade and its handle may be constructed similar to any approved type of pocket-knife (not shown) wherein the blade may be made foldable.

The blade 1 is arcuate or curved in cross section, and its end portion opposite the handle terminates in a curved extremity 5 conforming to the curvature of the bottom of the bowl of a pipe, so that when the blade is in action as in Figure 1 the carbon material may be easily ruptured, cut or loosened from the bottom of the bowl as well as from the side.

One edge of the blade is provided with a plurality of sharpened teeth 6, and the opposite portion of the blade has a sharpened edge, and due to the blade being curved or arcuate in cross section as identified at 7 the teeth 6 and the sharpened straight edge 8 are directed toward the surface of the bowl. The teeth, when the blade is in action, moved in one direction, the blade being at an angle to the surface of the bowl as in Figure 1, will gouge into the carbon material and rupture, cut or loosen the same. The teeth 6 and the sharpened straight edge 8 also continue through and in conformity to the curved extremity 5 of the blade, so that the teeth will loosen or cut the carbon at the bottom of the interior of the bowl at the same time the carbon is removed from the sides. A reverse movement of the blade, that is in the opposite direction imparting a sufficient turn to the blade to hold it at an angle to the surface of the bowl, the sharpened straight edge will not only further loosen the under portion of the carbon below that previously removed by the teeth, but will smooth the side and bottom of the interior of the bowl, furthermore due to the concavity of one face of the blade, caused to be formed by the arcuate shape of the blade in cross section, the ruptured or loosened carbon will tend to fall to the bottom of the bowl until the bowl is inverted to dislodge the loosened carbon.

Also due to the blade having a convexed surface opposite the concavity, the convexed surface also merged into the teeth and the sharpened straight edge, the carbon is more readily plowed or gouged from the surface of the bowl and the bottom. Furthermore the extreme edge 9 at the end of the curved extremity 5 is also curved and sharpened tending toward further loosening the carbon material especially at the bottom of the bowl when the knife blade is in action, acting to smooth the central portion of the bottom of the bowl.

The invention having been set forth what is claimed is:

A pipe bowl cleaning knife having a handle and provided with a blade to engage with the inner surface of the bowl said blade being curved to conform to the bottom of the bowl, so that either edge of the blade may scrape against the bottom, one edge of the blade throughout the length of the edge and the curved extremity being toothed, the other edge of the blade being sharpened, the blade being of arcuate formation in cross-section, whereby after the toothed edge has scraped against the inner surface of the bowl in moving the blade in one direction, the blade may rock with the convex surface of the blade engaging the inner surface of the bowl, so that the sharpened edge may scrape against the surface of the bowl, and thereby smooth said inner surface.

In testimony whereof he affixes his signature.

FRED L. FRASER.